United States Patent
Niu et al.

(10) Patent No.: US 11,294,047 B2
(45) Date of Patent: Apr. 5, 2022

(54) METHOD, APPARATUS, AND SYSTEM FOR RECOGNIZING TARGET OBJECT

(71) Applicant: SENSETIME INTERNATIONAL PTE. LTD., Singapore (SG)

(72) Inventors: Daming Niu, Singapore (SG); Jin Wu, Singapore (SG); Kaige Chen, Singapore (SG); Haiyu Zhao, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 77 days.

(21) Appl. No.: 16/852,446

(22) Filed: Apr. 18, 2020

(65) Prior Publication Data

US 2021/0190937 A1   Jun. 24, 2021

Related U.S. Application Data

(63) Continuation of application No. PCT/IB2020/052583, filed on Mar. 20, 2020.

(30) Foreign Application Priority Data

Dec. 23, 2019  (SG) .......................... 10201913005Y (51) Int. Cl.
  *G01S 13/86*  (2006.01)
  *G01S 13/89*  (2006.01)
  *G01S 7/52*   (2006.01)

(52) U.S. Cl.
  CPC ........ *G01S 13/867* (2013.01); *G01S 7/52017* (2013.01); *G01S 13/89* (2013.01)

(58) Field of Classification Search
  CPC ..... G01S 13/867; G01S 7/52017; G01S 13/89
  (Continued)

(56) References Cited

U.S. PATENT DOCUMENTS 8,893,212 B2 * 11/2014 Reisman ............ H04N 21/2387
                                                    725/113
9,129,189 B2 *  9/2015 Hamsici ............... G06K 9/6277
(Continued)

FOREIGN PATENT DOCUMENTS

AU        2017305765 A1 †  2/2019
CN          102510476 A     6/2012
(Continued)

OTHER PUBLICATIONS

Korean Intellectual Property Office, Office Action Issued in Application No. 10-2020-7012204, dated Aug. 26, 2021, 8 pages.
(Continued)

*Primary Examiner* — Bernarr E Gregory
*Assistant Examiner* — Nuzhat Pervin (57) ABSTRACT

Embodiments of the present specification provide a target recognition method, apparatus, and system. The method comprises: obtaining an image recognition result and a radio frequency recognition result of target objects in a target region, and then determining the distribution of the target objects in the target region according to the radio frequency recognition result and the image recognition result. Since the radio frequency recognition result and the image recognition result are fused, the target objects in the target region can be accurately recognized, so as to improve the recognition accuracy.

16 Claims, 3 Drawing Sheets

(58) Field of Classification Search
USPC .......................................................... 342/52
See application file for complete search history.

(56) References Cited

U.S. PATENT DOCUMENTS

| | | | |
|---|---|---|---|
| 9,131,128 B2* | 9/2015 | Meyers | G06V 10/30 |
| 9,245,337 B2* | 1/2016 | Schmidt | G06K 9/6253 |
| 9,310,891 B2* | 4/2016 | Rafii | G02B 27/017 |
| 9,727,959 B2* | 8/2017 | Meyers | G06T 5/008 |
| 9,753,542 B2* | 9/2017 | Chizeck | A61B 34/25 |
| 9,971,492 B2* | 5/2018 | Chandler | G06F 3/0482 |
| 10,013,766 B2* | 7/2018 | King | G01B 11/00 |
| 10,102,444 B2* | 10/2018 | Kim | G06N 3/0454 |
| 10,402,980 B2* | 9/2019 | Mutti | G06T 7/13 |
| 10,466,794 B2* | 11/2019 | Maeda | G06F 3/017 |
| 10,672,120 B2* | 6/2020 | Kang | G06T 7/181 |
| 10,839,573 B2* | 11/2020 | Marino | G06T 7/536 |
| 10,871,558 B2* | 12/2020 | Hewett | G01S 13/74 |
| 2007/0184898 A1* | 8/2007 | Miller | G07D 9/002 463/29 |
| 2008/0180250 A1* | 7/2008 | Steil | A63F 1/06 340/572.1 |
| 2010/0077003 A1* | 3/2010 | Kondo | G06V 20/70 707/769 |
| 2012/0040330 A1* | 2/2012 | Carpenter | C12Q 1/02 435/3 |
| 2015/0379366 A1 | 12/2015 | Nomura et al. | |
| 2016/0125252 A1* | 5/2016 | Harada | G06V 10/421 382/103 |
| 2017/0351934 A1* | 12/2017 | Ruan | G06F 16/58 |
| 2018/0144166 A1 | 5/2018 | Shigeta | |
| 2018/0161298 A1* | 6/2018 | Deretic | A61K 38/53 |
| 2018/0343442 A1* | 11/2018 | Yoshikawa | H04N 13/117 |
| 2018/0350191 A1 | 12/2018 | Shigeta | |
| 2018/0350193 A1 | 12/2018 | Shigeta | |
| 2019/0180153 A1* | 6/2019 | Buckler | G06K 9/00147 |
| 2019/0183445 A1* | 6/2019 | Okuno | A61B 6/12 |
| 2019/0340873 A1 | 11/2019 | Shigeta | |
| 2019/0385415 A9 | 12/2019 | Grauzer et al. | |
| 2020/0034630 A1* | 1/2020 | Oami | G06T 7/292 |
| 2020/0090371 A1* | 3/2020 | Hu | H04N 17/002 |
| 2020/0342253 A1* | 10/2020 | Li | G06V 10/454 |

FOREIGN PATENT DOCUMENTS

| | | | | |
|---|---|---|---|---|
| CN | 202533947 U | 11/2012 | | |
| CN | 107368867 A | 11/2017 | | |
| CN | 110321744 A | 10/2019 | | |
| CN | 110678237 A | * 1/2020 | | A44C 21/00 |
| CN | 110678237 A | 1/2020 | | |
| KR | 20180034469 A | 4/2018 | | |
| KR | 20190026792 A | 3/2019 | | |
| WO | 2018025622 A1 | 2/2018 | | |
| WO | WO-2018025622 A1 | * 2/2018 | | A44C 21/00 |
| WO | WO-2019101021 A1 | * 5/2019 | | G06K 9/32 |

OTHER PUBLICATIONS

Search Report and Written Opinion for Singapore Application No. 10201913005Y, dated Jan. 23, 2020, 13 pages.

Shirasaka et al., "Supervised Learning for Object Classification from Image and RFID Data", Proceedings of 2006 SICE-ICASE International Joint Conference, Oct. 21, 2006, 5 pages.

International Search Report and Written Opinion for Application No. PCT/IB2020/052583, dated Aug. 4, 2020, 16 pages.

Macao Intellectual Property Office, Disagreement Issued in Application No. I/1694, Dec. 3, 2021, 35 pages.

\* cited by examiner
† cited by third party

METHOD, APPARATUS, AND SYSTEM FOR RECOGNIZING TARGET OBJECT

CROSS-REFERENCE TO RELATED APPLICATION

The present application is a continuation of International Application No. PCT/IB2020/052583, filed on Mar. 20, 2020, which claims a priority of the Singaporean patent application No. 10201913005Y filed on Dec. 23, 2019, all of which are incorporated herein by reference in their entirety.

TECHNICAL FIELD

The present disclosure relates to a computer vision technical field, in particular, to a method, apparatus, and system for recognizing target object.

BACKGROUND

During daily production and lives, some target objects are normally required to be recognized. Taking an entertainment scene of board game as an example, in some board games, game currencies on a desktop are required to be recognized to obtain the position, category, and number of the game currencies on the desktop. However, the conventional recognition method has a low recognition accuracy.

SUMMARY

The present disclosure provides a method, apparatus, and system for recognizing target object.

Specifically, the present disclosure is implemented via the following technical solutions.

A method for recognizing target object is provided according to a first aspect of the embodiments of the present disclosure, which includes:

obtaining an image of a target region;

determining an image recognition result of target objects in the target region according to the image;

obtaining a radio frequency recognition result of the target objects in the target region;

determining the distribution of the target objects in the target region according to the radio frequency recognition result and the image recognition result.

In some embodiments, determining the image recognition result of the target objects in the target region according to the image includes: processing the image via a neural network to output the image recognition result of the target objects in the target region.

In some embodiments, obtaining the radio frequency recognition result of the target objects in the target region includes: obtaining the radio frequency recognition result of the target objects in the target region via a radio frequency detection antenna arranged in the target region.

In some embodiments, the radio frequency recognition result is obtained by reading a radio frequency recognition tag disposed on each target object via the radio frequency detection antenna.

In some embodiments, the target region includes at least one sub-region; the image recognition result includes N candidate categories having the maximum confidence of target object in each of the at least one sub-region and the number of the target objects in each of the at least one sub-region;

determining the distribution of the target objects in the target region according to the radio frequency recognition result and the image recognition result includes:

matching the number of the target objects and the N candidate categories in each of the at least one sub-region in the image recognition result with categories and the number of the target objects of each category in the radio frequency recognition result according to a descending order of confidence in the image recognition result and a descending order of the number of the target objects in each of the at least one sub-region in the image recognition result;

obtaining a category and the number of the target objects in each of the at least one sub-region.

In some embodiments, matching the number of the target objects and the N candidate categories in each of the at least one sub-region in the image recognition result with the categories and the number of the target objects of each category in the radio frequency recognition result according to the descending order of confidence in the image recognition result and the descending order of the number of the target objects in each of the at least one sub-region in the image recognition result includes:

matching a k-th candidate category of the target objects in an m-th sub-region and the number of the target objects in the m-th sub-region with the categories and the number of the target objects of each category in the radio frequency recognition result; wherein the k-th candidate category is one of the N candidate category corresponding to a confidence number k; confidence numbers are obtained by ranking the N candidate categories having the maximum confidence of target object in the m-th sub-region in the image recognition result according to the descending order of confidence; the m-th sub-region is a sub-region corresponding to a sub-region number m in the at least one sub-region; sub-region numbers are obtained by ranking the number of the target objects in each of the at least one sub-region in the image recognition result in a descending order;

in response to that the categories in the radio frequency recognition result include the k-th candidate category, and the number of the target objects of the k-th candidate category in the radio frequency recognition result is greater than zero, determining that a category of the target objects in the m-th sub-region is the k-th candidate category of the target objects in the m-th sub-region in the image recognition result and the number of the target objects in the m-th sub-region is the number of the target objects in the m-th sub-region in the image recognition result; and deducting the number of the target objects in the m-th sub-region from the number of the target objects of the k-th candidate category in the radio frequency recognition result to obtain an adjusted radio frequency recognition result.

In some embodiments, the method further includes:

in response to that the categories in the radio frequency recognition result do not include the k-th candidate category or in response to that the categories in the radio frequency recognition result include the k-th candidate category but the number of the target objects of the k-th candidate category in the radio frequency recognition result is not greater than zero, determining that matching is unsuccessful; and taking the m-th sub-region as a sub-region to be matched.

In some embodiments, when determining that the sub-region to be matched exists, the method further includes:

in response to that the number of the target objects of each category in the radio frequency recognition result is not greater than zero, determining that one or more candidate categories, in the N candidate categories having the maximum confidence in the sub-region to be matched, appear in the categories of the radio frequency recognition result, taking the candidate category having the maximum confidence in the one or more appeared candidate categories as the category of the target objects in the sub-region to be matched, and taking the number of the target objects in the sub-region to be matched in the image recognition result as the number of the target objects in the sub-region to be matched.

In some embodiments, when determining that the sub-region to be matched exists, the method further includes:

in response to that the number of the target objects of each category in the radio frequency recognition result is not greater than zero, determining that none of the N candidate categories having the maximum confidence in the sub-region to be matched, appears in the categories of the radio frequency recognition result, taking the candidate category having the maximum confidence as the category of the target objects in the sub-region to be matched, and taking the number of the target objects in the sub-region to be matched in the image recognition result as the number of the target objects in the sub-region to be matched.

In some embodiments, when determining that a sub-region to be matched exists, the method further includes:

in response to that the number of the target objects of at least one category in the radio frequency recognition result is greater than zero, taking the category with the maximum number of the target objects in the radio frequency recognition result as the category of the target objects in the sub-region to be matched with the maximum number of the target objects in the image recognition result, and taking the number of the target objects in the sub-region to be matched with the maximum number of the target objects in the image recognition result as the number of the target objects in the sub-region to be matched with the maximum number of the target objects in the image recognition result; and deducting the number of the target objects in the sub-region to be matched with the maximum number of the target objects in the image recognition result from the number of the target objects in the category with the maximum number of the target objects in the radio frequency recognition result to obtain an adjusted radio frequency recognition result.

In some embodiments, the image is a top view or a side view of the target object.

In some embodiments, the top view is collected by an image collection device above the target region, and the side view is collected by an image collection device at the side of the target region.

An apparatus for recognizing target object is provided according to a second aspect of the embodiments of the present disclosure, which includes: a first obtaining module, configured to obtain an image of a target region;

a first determining module, configured to determine an image recognition result of target objects in the target region according to the image;

a second obtaining module, configured to obtain a radio frequency recognition result of the target objects in the target region; and a second determining module, configured to determine a distribution of the target objects in the target region according to the radio frequency recognition result and the image recognition result.

In some embodiments, the first determining module is configured to: process the image via a neural network to output the image recognition result of the target objects in the target region.

In some embodiments, the second obtaining module is configured to: obtain the radio frequency recognition result of the target objects in the target region via a radio frequency detection antenna arranged in the target region.

In some embodiments, the radio frequency recognition result is obtained by reading a radio frequency recognition tag disposed on each target object via the radio frequency detection antenna.

In some embodiments, the target region includes at least one sub-region; the image recognition result includes N candidate categories having the maximum confidence of target object in each of the at least one sub-region and the number of the target objects in each of the at least one sub-region;

the second determining module is configured to:

match the number of the target objects and the N candidate categories in each of the at least one sub-region in the image recognition result with categories and the number of the target objects of each category in the radio frequency recognition result according to a descending order of confidence in the image recognition result and a descending order of the number of the target objects in each of the at least one sub-region in the image recognition result; and obtain a category and the number of the target objects in each of the at least one sub-region.

In some embodiments, the second determining module includes:

a matching unit, configured to match a k-th candidate category of the target objects in an m-th sub-region and the number of the target objects in the m-th sub-region with the categories and the number of the target objects of each category in the radio frequency recognition result; wherein the k-th candidate category is one of the N candidate category corresponding to a confidence number k; confidence numbers are obtained by ranking the N candidate categories having the maximum confidence of target object in the m-th sub-region in the image recognition result according to the descending order of confidence; the m-th sub-region is a sub-region corresponding to a sub-region number m in the at least one sub-region; sub-region numbers are obtained by ranking the number of the target objects in each of the at least one sub-region in the image recognition result in a descending order;

a determining unit, configured to, configured to, in response to that the categories in the radio frequency recognition result include the k-th candidate category, and the number of the target objects of the k-th candidate category in the radio frequency recognition result is greater than zero, determine that a category of the target objects in the m-th sub-region is the k-th candidate category of the target objects in the m-th sub-region in the image recognition result and the number of the target objects in the m-th sub-region is the number of the target objects in the m-th sub-region in the image recognition result; and an adjusting unit, configured to deduct the number of the target objects in the m-th sub-region from the number of the target objects of the k-th candidate category in the radio frequency recognition result to obtain an adjusted radio frequency recognition result.

In some embodiments, the apparatus further includes:

a third determining module, configured to, in response to that the categories in the radio frequency recognition result do not include the k-th candidate category or in response to that the categories in the radio frequency recognition result include the k-th candidate category but the number of the target objects of the k-th candidate category in the radio frequency recognition result is not greater than zero, determine that matching is unsuccessful; and a fourth determining module, configured to take the m-th sub-region as a sub-region to be matched.

In some embodiments, when determining that the sub-region to be matched exists, the apparatus further includes:

a fifth determining module, configured to, in response to that the number of the target objects of each category in the radio frequency recognition result is not greater than zero, determine that one or more candidate categories, in the N candidate categories having the maximum confidence in the sub-region to be matched, appear in the categories of the radio frequency recognition result, take the candidate category having the maximum confidence in the one or more appeared candidate categories as the category of the target objects in the sub-region to be matched, and take the number of the target objects in the sub-region to be matched in the image recognition result as the number of the target objects in the sub-region to be matched.

In some embodiments, when determining that the sub-region to be matched exists, the apparatus further includes:

a sixth determining module, configured to, in response to that the number of the target objects of each category in the radio frequency recognition result is not greater than zero, determine that none of the N candidate categories having the maximum confidence in the sub-region to be matched, appears in the categories of the radio frequency recognition result, take the candidate category having the maximum confidence as the category of the target objects in the sub-region to be matched, and take the number of the target objects in the sub-region to be matched in the image recognition result as the number of the target objects in the sub-region to be matched.

In some embodiments, when determining that a sub-region to be matched exists, the apparatus further includes:

a seventh determining module, configured to, in response to that the number of the target objects of at least one category in the radio frequency recognition result is greater than zero, take the category with the maximum number of the target objects in the radio frequency recognition result as the category of the target objects in the sub-region to be matched with the maximum number of the target objects in the image recognition result, and take the number of the target objects in the sub-region to be matched with the maximum number of the target objects in the image recognition result as the number of the target objects in the sub-region to be matched with the maximum number of the target objects in the image recognition result; and an adjusting module, configured to, deduct the number of the target objects in the sub-region to be matched with the maximum number of the target objects in the image recognition result from the number of the target objects in the category with the maximum number of the target objects in the radio frequency recognition result to obtain an adjusted radio frequency recognition result.

In some embodiments, the image is a top view or a side view of the target object.

In some embodiments, the top view is collected by an image collection device above the target region, and the side view is collected by an image collection device at the side of the target region.

A system for recognizing target object is provided according to a third aspect of the embodiments of the present disclosure, which includes:

an image collection apparatus, configured to obtain an image of a target region;

a radio frequency detection apparatus, configured to obtain a radio frequency recognition result of target objects in the target region; and a processor, configured to determine an image recognition result of the target objects in the target region according to the image; and determine a distribution of the target objects in the target region according to the radio frequency recognition result and the image recognition result.

In some embodiments, the radio frequency detection apparatus includes:

a radio frequency detection antenna and radio frequency recognition tags;

the radio frequency recognition tags are separately disposed on each target object, and the radio frequency detection antenna is disposed in the target region.

In some embodiments, a radio frequency recognition tag is embedded in a target object or is attached to a surface of a target object.

In some embodiments, there are multiple target regions; the system further includes:

an isolation apparatus, configured to isolate each target region, and to prevent a radio frequency detection apparatus in a target region from obtaining a radio frequency signal of target objects in other target regions.

In some embodiments, the isolation apparatus is made of a metal material.

In some embodiments, the image collection apparatus includes a first image collection apparatus disposed above the target region and/or a second image collection apparatus disposed at the side of the target region.

In some embodiments, determining, by the processor, the image recognition result of the target objects in the target region according to the image includes:

processing the image via a neural network to output the image recognition result of the target objects in the target region.

In some embodiments, the target region includes at least one sub-region; the image recognition result includes N candidate categories having the maximum confidence of target object in each of the at least one sub-region and the number of the target objects in each of the at least one sub-region;

determining, by the processor, the distribution of the target objects in the target region according to the radio frequency recognition result and the image recognition result includes:

matching the number of the target objects and the N candidate categories in each of the at least one sub-region in the image recognition result with categories and the number of the target objects of each category in the radio frequency recognition result according to a descending order of confidence in the image recognition result and a descending order of the number of the target objects in each of the at least one sub-region in the image recognition result; and obtaining a category and the number of the target objects in each of the at least one sub-region.

In some embodiments, matching, by the processor, the number of the target objects and the N candidate categories in each of the at least one sub-region in the image recognition result with the categories and the number of the target objects of each category in the radio frequency recognition result according to the descending order of confidence in the image recognition result and the descending order of the number of the target objects in each of the at least one sub-region in the image recognition result includes:

matching a k-th candidate category of the target objects in an m-th sub-region and the number of the target objects in the m-th sub-region with the categories and the number of the target objects of each category in the radio frequency recognition result; wherein the k-th candidate category is one of the N candidate category corresponding to a confidence number k; confidence numbers are obtained by ranking the N candidate categories having the maximum confidence of target object in the m-th sub-region in the image recognition result according to the descending order of confidence; the m-th sub-region is a sub-region corresponding to a sub-region number m in the at least one sub-region; sub-region numbers are obtained by ranking the number of the target objects in each of the at least one sub-region in the image recognition result in a descending order;

in response to that the categories in the radio frequency recognition result include the k-th candidate category, and the number of the target objects of the k-th candidate category in the radio frequency recognition result is greater than zero, determining that a category of the target objects in the m-th sub-region is the k-th candidate category of the target objects in the m-th sub-region in the image recognition result and the number of the target objects in the m-th sub-region is the number of the target objects in the m-th sub-region in the image recognition result; and deducting the number of the target objects in the m-th sub-region from the number of the target objects of the k-th candidate category in the radio frequency recognition result to obtain an adjusted radio frequency recognition result.

In some embodiments, the processor is further configured to:

in response to that the categories in the radio frequency recognition result do not include the k-th candidate category or in response to that the categories in the radio frequency recognition result include the k-th candidate category but the number of the target objects of the k-th candidate category in the radio frequency recognition result is not greater than zero, determine that matching is unsuccessful; and take the m-th sub-region as a sub-region to be matched.

In some embodiments, when determining that the sub-region to be matched exists, the processor is further configured to:

in response to that the number of the target objects of each category in the radio frequency recognition result is not greater than zero, determine that one or more candidate categories, in the N candidate categories having the maximum confidence in the sub-region to be matched, appear in the categories of the radio frequency recognition result, take the candidate category having the maximum confidence in the one or more appeared candidate categories as the category of the target objects in the sub-region to be matched, and take the number of the target objects in the sub-region to be matched in the image recognition result as the number of the target objects in the sub-region to be matched.

In some embodiments, when determining that the sub-region to be matched exists, the processor is further configured to:

in response to that the number of the target objects of each category in the radio frequency recognition result is not greater than zero, determine that none of the N candidate categories having the maximum confidence in the sub-region to be matched, appears in the categories of the radio frequency recognition result, take the candidate category having the maximum confidence as the category of the target objects in the sub-region to be matched, and take the number of the target objects in the sub-region to be matched in the image recognition result as the number of the target objects in the sub-region to be matched.

In some embodiments, when determining that a sub-region to be matched exists, the processor is further configured to:

in response to that the number of the target objects of at least one category in the radio frequency recognition result is greater than zero, take the category with the maximum number of the target objects in the radio frequency recognition result as the category of the target objects in the sub-region to be matched with the maximum number of the target objects in the image recognition result, and take the number of the target objects in the sub-region to be matched with the maximum number of the target objects in the image recognition result as the number of the target objects in the sub-region to be matched with the maximum number of the target objects in the image recognition result; and deduct the number of the target objects in the sub-region to be matched with the maximum number of the target objects in the image recognition result from the number of the target objects in the category with the maximum number of the target objects in the radio frequency recognition result to obtain an adjusted radio frequency recognition result.

According to a fourth aspect of the embodiments of the present disclosure, a computer-readable storage medium is provided. A computer program is stored thereon, and when the computer program is executed by a processor, the method according to any one of the embodiments is implemented.

According to a fifth aspect of the embodiments of the present disclosure, a computer device is provided, including a memory, a processor, and a computer program stored on the memory and running on the processor, where when the computer program is executed by the processor, the method according to any one of the embodiments is implemented.

Embodiments of the present specification include obtaining an image recognition result and a radio frequency recognition result of target objects in the target region, and then determining distribution of the target objects in the target region according to the radio frequency recognition result and the image recognition result. Since the radio frequency recognition result and the image recognition result are fused, the target objects in the target region can be accurately recognized, so as to improve recognition accuracy.

It should be understood that the foregoing general descriptions and the following detailed descriptions are merely exemplary and explanatory, but are not intended to limit the present disclosure.

BRIEF DESCRIPTION OF THE DRAWINGS

The accompanying drawings here are incorporated into the specification and constitute a part of the specification. These accompanying drawings show embodiments that conform to the present disclosure, and are intended to describe the technical solutions in the present disclosure together with the specification.

DETAILED DESCRIPTION OF THE EMBODIMENTS

Exemplified embodiments would be explained in detail herein, and examples thereof are represented in drawings. When the description relates to the drawings, unless otherwise indicated, the same number in different drawings represents the same or similar element. Implementations described in the following exemplified embodiments do not represent all implementations consistent with the present application. On the contrary, they are only examples for apparatuses and methods consistent in same aspects of the present application as detailed in the attached claims.

Terms used in the present application merely aim at describing a specific embodiment rather than aiming at limitation of the present application. Terms "a", "said", and "the" in a single form used in the present application and the attached claims also aim at including a multiple form, unless other meanings are clearly represented in the context. It should also be understood that the term "and/or" used in the present text refers to any or all possible combinations including one or more associated listed terms. In addition, the term "at least one" in the present text represents any combination of at least two of any one or multiple of the multiple types.

It should be understood that the present application may use terms such as first, second, and third to describe information, but these information shall not be limited to these terms. These terms are merely used for distinguishing the same type of pieces of information from one another. For example, in the case of not departing from the scope of the present application, the first information may also be referred to as the second information; similarly, the second information may also be referred to as the first information. Depending on the context, for example, the term "if" used herein may be explained as "when" or "upon", or "in response to a determination".

For a person skilled in the art to better understanding the technical solutions in the embodiments of the present disclosure and to enable the aforementioned purpose, features, and advantages of the embodiments of the present disclosure to be more obvious and understandable, the technical solutions in the embodiments of the present disclosure are further explained in detail by combining the drawings.

Figure 1:
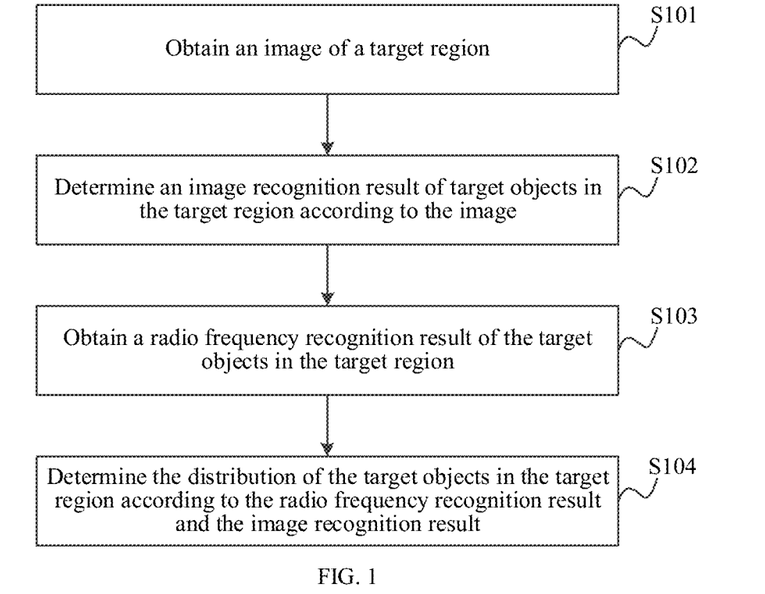
FIG. 1 is a flowchart of a method for recognizing target object according to embodiments of the present disclosure.

FIG. 1 is a flowchart of a method for recognizing target object according to embodiments of the present disclosure. The method includes:

Step S101: an image of a target region is obtained;

Step S102: an image recognition result of target objects in the target region is determined according to the image;

Step S103: a radio frequency recognition result of target objects in the target region is obtained; and Step S104: a distribution of the target objects in the target region is determined according to the radio frequency recognition result and the image recognition result.

Figure 2:
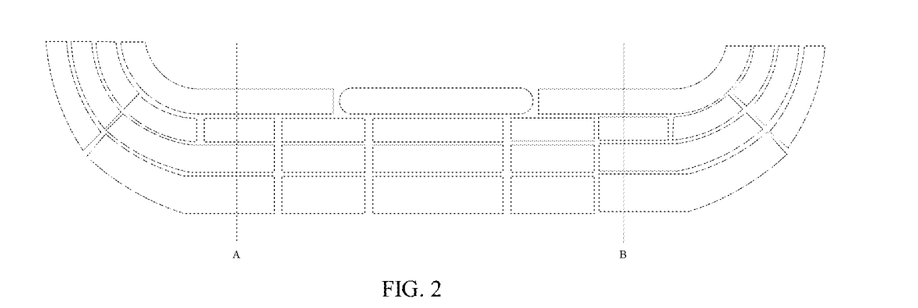
FIG. 2 is a schematic diagram of a target region according to embodiments of the present disclosure.

For step S101, the target region is a region where target objects are placed, for example, the target region may be a plane (for example, a desktop), a container (for example, a box), etc. The target object may be one or more articles; in some common conditions, the target objects are sheet-shaped articles in various shapes, for example, game currencies. FIG. 2 shows a partial schematic diagram of the desktop in a board game scene; the desktop includes multiple target regions, where each closed region represents a target region. The target objects in this scene are the game currencies on the desktop.

Figure 3A:
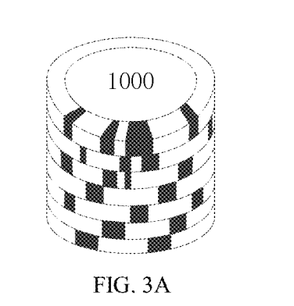
FIG. 3A is a schematic diagram of target objects according to an embodiment of the present disclosure.
Figure 3B:
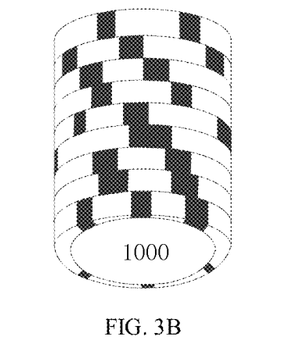
FIG. 3B is a schematic diagram of target objects according to another embodiment of the present disclosure.

Each target object can be stacked in the target region, and the stacking modes includes a first stacking mode in which the target objects are stacked in a vertical direction and a second stacking mode in which the target objects are stacked in a horizontal direction. The first stacking mode is shown in FIG. 3A. The second stacking mode is shown in FIG. 3B. In embodiments shown in FIG. 3A and FIG. 3B, the shape of each target object is cylindrical, and each target object includes two parallel and equal sized bottom planes and a curving plane connecting the two bottom planes. In the first stacking mode, the bottom plane of the lowest target object contacts the target region and a straight-line connecting centers of bottom planes of each target object is perpendicular to the target region, such as the desktop. In the second stacking mode, the curving plane of each target object contacts the target region a straight-line connecting centers of bottom planes of each target object is parallel with the target region, such as the desktop.

An image collection apparatus (for example, a camera device or a camera) adjacent to the target region is used for photographing an image of the target regions including the target objects. To clearly present the target objects stacked in the first stacking mode and the second stacking mode in the image, an image collection apparatus disposed at the side of the target region can be used for photographing a first image including the target objects stacked in the first stacking mode and an image collection apparatus disposed above the target region can be used for photographing a second image including the target objects stacked in the second stacking mode. Furthermore, at least one image collection apparatus can be set at both sides of the target region so as to completely obtain the image of the entire target region. For a plurality of target regions shown in FIG. 2, image collection apparatuses can be set at both, i.e., left and right sides of the entire desktop; the left side image collection apparatus may photograph the target regions at the left half of the desktop (for example, the left side of a dotted line B), and the right side image collection apparatus may photograph the target regions at the right half of the desktop (for example, the right side of a dotted line A).

For step S102, the target region to which each target object belongs can be determined first according to a pixel coordinate range of each target region and a pixel coordinate range of the target object. If the pixel coordinate range of the target object falls in the pixel coordinate range of a target region, it is determined that the target object belongs to the target region. After determining the target region to which each target object belongs, the image recognition result of the target objects in the target region is further obtained. The image recognition result includes the number, position, and category of target objects in the target region.

In some embodiments, a neural network can be used for processing the image to output the image recognition result of the target objects in the target region. The neural network may predict the position, category, and number of target objects in the target region. In some embodiments, the target region includes multiple sub-regions; position information of target objects output by the neural network is the sub-region where each target object is located; category information output by the neural network is the category of the target objects in each sub-region; quantity information output by the neural network is the number of the target objects in each sub-region.

Figure 4:
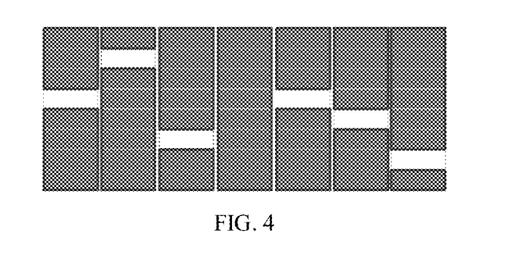
FIG. 4 is a schematic diagram of a target object in each sub-region according to embodiments of the present disclosure.

For example, game currencies on the desktop can be divided into multiple sub-regions via a white separation plate (i.e., spacer). As shown in FIG. 4, it is a schematic diagram of dividing the target objects in a target region into multiple sub-regions. Each gray block is a target object; target objects in different black boxes belong to different sub-regions. The neural network may obtain a bounding box in each sub-region, i.e., the black box in FIG. 4, and then output a category prediction result of the target objects in each sub-region and a quantity prediction result of the target objects in each sub-region.

The category prediction result includes a confidence of the category to which the target objects belong in the sub-region, and generally, category prediction result with first three confidences can be output. For example, the confidence of the target objects belonging to category 1 is 0.5, the confidence belonging to category 2 is 0.3, the confidence belonging to category 3 is 0.1, . . . , and then the neural network may output the following category prediction result: {category 1:0.5; category 2:0.3; category 3:0.1}. The quantity prediction result may be represented by the length of the sub-region. Assuming that the pixel length occupied by each target object is N pixel values and the pixel length of the sub-region is M pixel values, the number of the target objects in the sub-region is M/N.

For step S103, the target objects in the target region can be recognized by the radio frequency detection antenna disposed in the target region to obtain the radio frequency recognition result of the target objects in the target region.

The mounting position of the radio frequency detection antenna in the target region only needs to be able to implement recognition of the target objects in the target region, which is not limited by the present disclosure. In the board game application scene, the radio frequency detection antenna may be arranged below a tablecloth of the target region, and may also be arranged at the bottom of the container for accommodating the game currencies.

If there are multiple target regions, for each target region, a radio frequency detection antenna can be disposed in the target region; and the radio frequency detection antenna in the target region is only used to recognize the target objects in the target region. To avoid mutual interference among different target regions, an isolation apparatus may be provided among the target regions, so that the radio frequency antenna in the target region is only used to detect the target objects in the target region. The isolation apparatus may be articles made of metals, such as a metal sheet. The isolation apparatus may be arranged around each target region. For the radio frequency detection antenna arranged at the bottom of the container, the isolation apparatus may be arranged around the container.

A radio frequency recognition tag used as a set with the radio frequency detection antenna can be disposed on each target object in advance. The radio frequency recognition tag may be embedded in the target object or may be attached to the surface of the target object. Tag information of the radio frequency recognition tag read by the radio frequency detection antenna can be obtained and a radio frequency recognition result of the target object in the target region can be obtained according to the tag information. The radio frequency recognition result may include the category and number of the target objects in each target region.

Recognition of the target objects based on the image may relatively accurately recognize the position and number of the target objects, but due to the influences by factors such as scene light, some false detection conditions may occur to category detection on the target objects. Recognition of the target objects based on radio frequency technology may relatively accurately recognize the categories of the target objects, but due to influences by factors such as electromagnetic interferences and device damages, some false detection conditions may occur to quantity detection on the target objects, and the radio frequency recognition result cannot determine the position of the target object in the target region.

Hence, for step S104, the position and quantity of the target objects can be recognized by the image recognition result, and the category obtained by the image recognition result can be verified by the radio frequency recognition result to obtain accurate category information. The category of the target objects in the sub-region may be determined by the radio frequency recognition result, and the quantity of the target objects in the sub-region may be determined by the image recognition result.

In some embodiments, the target region includes at least one sub-region, and the image recognition result includes N candidate categories having the maximum confidence of target object in each sub-region and the number of the target objects in each sub-region; determining the distribution of the target objects in the target region according to the radio frequency recognition result and the image recognition result includes: matching the number of the target objects and the N candidate categories in each sub-region in the image recognition result with categories and the number of the target objects of each category in the radio frequency recognition result according to a descending order of confidence in the image recognition result and a descending order of the number of the target objects in each sub-region in the image recognition result; and obtaining a category and the number of the target objects in each sub-region. N is an integer greater than or equal to 1.

A candidate category may generally adopt three categories with the maximum confidence. Assuming that the image recognition result is: the target region includes 3 sub-regions, wherein sub-region i includes $K_i$ target objects (i=1, 2, or 3, $K_1 > K_2 > K_3$ and $K_i$ is an integer greater than or equal to 1), each sub-region corresponds to three candidate categories; the candidate category with the maximum confidence is referred to as top 1 candidate category; the candidate category with the second maximum confidence is referred to as top 2 candidate category; candidate category with the third maximum confidence is referred to as top 3 candidate category. Therefore, matching can first be sequentially performed on the top 1 candidate category of the target objects in sub-regions 1, 2, and 3, and the categories as well as the number of the target objects of each category in the radio frequency recognition result; then matching can be sequentially performed on the top 2 candidate category of the target objects in sub-regions 1, 2, and 3, and the categories as well as the number of the target objects of each category in the radio frequency recognition result; and finally matching can be sequentially performed on the top 3 candidate category of the target objects in sub-regions 1, 2, and 3, and the categories as well as the number of the target objects of each category in the radio frequency recognition result; the category and number of the target objects in the sub-regions 1, 2, and 3 can be obtained according to the matching results above.

Specifically, a k-th candidate category of the target objects in an m-th sub-region and the number of the target objects in the m-th sub-region can be matched with the categories and the number of the target objects of each category in the radio frequency recognition result; under the condition that the categories in the radio frequency recognition result include the k-th candidate category of the target objects in the m-th sub-region, and the number of the target objects of the k-th candidate category in the radio frequency recognition result is greater than zero, it is determined that the category of the target objects in the m-th sub-region is the k-th candidate category of the target objects in the m-th sub-region in the image recognition result and the number of the target objects in the m-th sub-region is the number of the target objects in the m-th sub-region in the image recognition result; and the number of the target objects in the m-th sub-region is deducted from the number of the target objects of the k-th candidate category in the radio frequency recognition result to obtain an adjusted radio frequency recognition result.

Where the k-th candidate category is one of the N candidate category corresponding to a confidence number k; confidence numbers are obtained by ranking the N candidate categories having the maximum confidence of target object in the m sub-region in the image recognition result according to the descending order of the confidences; the m-th sub-region is a sub-region corresponding to a sub-region number m in the at least one sub-region; sub-region numbers are obtained by ranking the number of the target objects in each sub-region in the image recognition result in a descending order.

Follow the example above. It is assumed that the radio frequency recognition result is: the target region includes J1 target objects belonging to a category C1, J2 target objects belonging to a category C2, and J3 target objects belonging to a category C3. J1, J2 and J3 are integer greater than or equal to 1. When matching the number of the target objects and the candidate categories with different confidences in each sub-region in the image recognition result with the categories and the number of the target objects of each category in the radio frequency recognition result, during a first round of matching, the first candidate category (marked as C11) of the target objects in a first sub-region and the number (marked as K1) of the target objects in the first sub-region are matched with the categories and the number of the target objects of each category in the radio frequency recognition result. If C1, C2 and C3 includes a category which is the same as C11 (assuming C1 is the same as C11), and the number of the target objects of the category which is the same as C11 in the radio frequency recognition result is greater than zero, the category of the target objects in the first sub-region is determined as C11, and the number of the target objects in the first sub-region is K1. Then the number K1 of the target objects are deducted from the number J1 corresponding to the category C1 in the radio frequency recognition result to obtain the first adjusted radio frequency recognition result: J1-K1 target objects belonging to category C1, J2 target objects belonging to category C2, and J3 target objects belonging to category C3.

During a second round of matching, the first candidate category (marked as C21) of the target objects in a second sub-region and the number (marked as K2) of the target objects in the second sub-region are matched with the categories and the number of the target objects of each category in the radio frequency recognition result. If C1, C2 and C3 includes a category which is the same as C21 (assuming C2 is the same as C21), and the number of the target objects of the category which is the same as C21 in the radio frequency recognition result is greater than zero, the category of the target objects in the second sub-region is determined as C21, and the number of the target objects in the second sub-region is K2. Then the number K2 of the target objects are deducted from the number J2 corresponding to the category C2 in the first adjusted radio frequency recognition result to obtain the second adjusted radio frequency recognition result: J1-K1 target objects belonging to category C1, J2-K2 target objects belonging to category C2, and J3 target objects belonging to category C3.

Finally, during a third round of matching, the first candidate category (marked as C31) of the target objects in a third sub-region and the number (marked as K3) of the target objects in the third sub-region are matched with the categories and the number of the target objects of each category in the radio frequency recognition result. If C1, C2 and C3 includes a category which is the same as C31 (assuming C3 is the same as C31), and the number of the target objects of the category which is the same as C31 in the radio frequency recognition result is greater than zero, the category of the target objects in the third sub-region is determined as C31, and the number of the target objects in the third sub-region is K3. Then the number K3 of the target objects are deducted from the number J3 corresponding to the category C3 in the second adjusted radio frequency recognition result to obtain the third adjusted radio frequency recognition result: J1-K1 target objects belonging to category C1, J2-K2 target objects belonging to category C2, and J3-K3 target objects belonging to category C3.

In a relatively ideal matching condition, each category in the image recognition result can be successfully matched with a corresponding category in the radio frequency recognition result (no matter whether the number of the target objects of each category in the radio frequency recognition result is zero, as long as the category and number of the target objects in each sub-region in the image recognition result is determined, matching is considered to be successful). However, since the image recognition result may include misrecognized categories, a candidate category in the image recognition result may not exist in the radio frequency recognition result.

In some embodiments, under the condition that the categories in the radio frequency recognition result do not include the k-th candidate category of the target objects in the m-th sub-region, or under the condition that the categories in the radio frequency recognition result include the k-th candidate category of the target objects in the m-th sub-region but the number of the target objects of the category, which is the same as the k-th candidate category of the target objects in the m-th sub-region, in the radio frequency recognition result is not greater than zero, it is determined that the matching is unsuccessful; and the m-th sub-region is taken as a sub-region to be matched.

For example, in the embodiments above, when matching the candidate category and number of the target objects in the third sub-region with the categories and the number of the target objects of each category in the radio frequency recognition result, under the condition that none of categories C1, C2, and C3 in the radio frequency recognition result includes C31 in the image recognition result, or the radio frequency recognition result includes the category which is the same as C31, but the number corresponding to the category which is the same as C31 in the radio frequency recognition result is not greater than zero (for example, the candidate category C31 in the third sub-region in the image recognition result is the same as C1 in the radio frequency recognition result and after matching with the first sub-region, the number of the target objects belonging to the category C1 in the first adjusted radio frequency recognition result is adjusted to be zero), the matching of the third sub-region is unsuccessful, and the third sub-region may be taken as a sub-region to be matched.

In an actual application process, the same unsuccessful matching condition as the category C31 above may all occur to the candidate categories of the target objects in each sub-region. When the unsuccessful matching condition occurs to the candidate categories of the target objects in other sub-regions, the sub-regions may also be taken as sub-regions to be matched, which is omitted herein for conciseness.

In some embodiments, under the condition that a sub-region to be matched exists, the method further includes: under the condition that the number of the target objects of each category in the radio frequency recognition result is not greater than zero, determining that one or more candidate categories, in the N candidate categories having the maximum confidence in the sub-region to be matched, appear in the categories of the radio frequency recognition result, taking the candidate category having the maximum confidence in the one or more appeared candidate categories as the category of the target objects in the sub-region to be matched, and taking the number of the target objects in the sub-region to be matched in the image recognition result as the number of the target objects in the sub-region to be matched.

If a sub-region to be matched (still assuming to be sub-region 3) exists after at least one round of matching, the number of the target objects corresponding to the categories C1, C2, and C3 in the radio frequency recognition result is not greater than zero, and the top 2 candidate category C32 and the top 3 candidate category C33 of the target objects in sub-region 3 both appear in the categories of the radio frequency recognition result (for example, C2 is the same as C32, and C3 is the same as C33), the top 2 candidate category of the target objects in sub-region 3 is used as the category of the target objects in sub-region 3, and K3 is used as the number of the target objects in sub-region 3.

In some embodiments, under the condition that a sub-region to be matched exists, the method further includes: under the condition that the number of the target objects of each category in the radio frequency recognition result is not greater than zero, determining that none of the N candidate categories having the maximum confidence in the sub-region to be matched, appears in the categories of the radio frequency recognition result, taking the candidate category having the maximum confidence as the category of the target objects in the sub-region to be matched, and taking the number of the target objects in the sub-region to be matched in the image recognition result as the number of the target objects in the sub-region to be matched.

If a sub-region to be matched (still assuming to be sub-region 3) exists after at least one round of matching, the number of the target objects corresponding to the categories C1, C2, and C3 in the radio frequency recognition result is not greater than zero, and none of the top 1 candidate category C31, the top 2 candidate category C32, and the top 3 candidate category C33 of the target objects in sub-region 3 appears in the categories of the radio frequency recognition result, the top 1 candidate category of the target objects in sub-region 3 is used as the category of the target objects in sub-region 3, and K3 is used as the number of the target objects in sub-region 3.

In some embodiments, under the condition that a sub-region to be matched exist, the method further includes: under the condition that the number of the target objects of at least one category in the radio frequency recognition result is greater than zero, taking the category with the maximum number of the target objects in the radio frequency recognition result as the category of the target objects in the sub-region to be matched with the maximum number of the target objects in the image recognition result, and taking the number of the target objects in the sub-region to be matched with the maximum number of the target objects in the image recognition result as the number of the target objects in the sub-region to be matched with the maximum number of the target objects in the image recognition result; and deducting the number of the target objects in the sub-region to be matched with the maximum number of the target objects in the image recognition result from the number of the target objects in the category with the maximum number of the target objects in the radio frequency recognition result to obtain an adjusted radio frequency recognition result.

If sub-regions to be matched (assuming to be sub-regions 2 and 3) exists after at least one round of matching, the categories (assuming to be C2 and C3) with the number of target objects greater than zero exist in the radio frequency recognition result, and the number J2 of the target objects of C2 is greater than the number J3 of the target objects of C3, since the number K2 of the target objects in sub-region 2 is greater than the number K3 of the target objects in sub-region 3, C2 is used as the category of the target objects in sub-region 2, and K2 is used as the number of the target objects in sub-region 2. Then K2 is deducted from the number J2 of the target objects of the category C2 in the radio frequency recognition result to obtain the adjusted radio frequency recognition result: the number of the target objects of category C2 is J2-K2, and the number of the target objects of category C3 is J3.

In view of the above, the recognition process of the embodiments of the present disclosure may include the following conditions:

Step 1: according to the descending order of the number of the target objects in each sub-region in the image recognition result, the top 1 candidate category in each sub-region is first traversed, then the top 2 candidate category in each sub-region is traversed, and finally the top 3 candidate category in each sub-region is traversed. If the number of remaining target objects of the candidate category corresponding to the sub-region which is being classified in the radio frequency recognition result is greater than zero, it is considered that the category corresponding to the sub-region is the candidate category, the sub-region is removed from a queue to be classified (directly skipping a determination of other candidate categories in the sub-region), and the number of the target objects in the sub-region is subtracted from the number of remaining target objects of the category, which is the same as the candidate category, in the radio frequency recognition result.

Four conditions would occur after step 1 is ended:

A) the number of the remaining target objects of each category in the radio frequency recognition result is 0, and each sub-region in the target region has a classification result, that is, the category and quantity of target objects in each sub-region have been determined. In this case, the recognition process ends;

B) the number of the remaining target objects of each category in the radio frequency recognition result is 0, and a sub-region to be matched with no classification result exists. For each sub-region to be matched, if the radio frequency recognition result includes one or more candidate categories in the top 1 to top N candidate categories, the candidate category with the maximum confidence in the one or more candidate categories is taken as the category of target objects in the sub-region to be matched; if the radio frequency recognition result does not include any of the N candidate categories, the top 1 candidate category is taken as the category of target objects in the sub-region to be matched; and the number of target objects in the sub-region to be matched in the image recognition result is taken as the number of target objects in the sub-region to be matched. After the category and quantity of target objects in each sub-region to be matched have been determined, the recognition process ends;

C) the number of remaining target objects of one or more categories in the radio frequency recognition result is not zero, but each sub-region has a classification result. In this case, the recognition process ends;

D) the number of remaining target objects of one or more categories in the radio frequency recognition result is not zero, and at least one sub-region to be matched with no classification result exists. From step 1, it can be known that the one or more categories in the radio frequency recognition result are different from the N candidate categories in the sub-region to be matched. The category with the maximum number of remaining target objects in the one or more categories in the radio frequency recognition result is taken as the category of the sub-region to be matched with the maximum number of the target objects; the sub-region to be matched with the maximum number of the target objects is removed from the queue to be classified; and the number of the target objects in the sub-region to be matched with the maximum number of the target objects is subtracted from the number of remaining target objects of the category with the maximum number of remaining target objects in the radio frequency recognition result, to obtain the adjusted radio frequency recognition result. The above steps are successively performed. According to the results obtained by performing respective steps, A, B and C three conditions are entered and then determination is performed.

The technical solutions of the present disclosure are illustrated by an embodiment below.

Assuming that the target region includes sub-regions 1, 2, and 3, where the image recognition result is:

(1) sub-region 1: 13 target objects in total, three candidate categories with the maximum confidence in a descending order being category 5, category 10 and category 20;

(2) sub-region 2: 11 target objects in total, three candidate categories with the maximum confidence in a descending order being category 5, category 10 and category 20;

(3) sub-region 3: 4 target objects in total, three candidate categories with the maximum confidence in a descending order being category 20, category 5 and category 10.

The radio frequency recognition result is:

(1) category 5: the number of target objects being 13; (2) category 10: the number of target objects being 10; (1) category 50: the number of target objects being 4.

A statistical table can be created according to the radio frequency recognition result. The statistical table records each category and the number of target objects of each category in the radio frequency recognition result. After ranking the number of the target objects in each sub-region in the image recognition result, the top 1 candidate category for sub-region 1 is first matched first. For sub-region 1, the top 1 candidate category is category 5. Category 5 exists in the statistical table and thus the category of the target objects in sub-region 1 is marked as category 5. According to the image recognition result, the number of the target objects in sub-region 1 is 13. The number of target objects of category 5 in the statistical table subtracts 13, to be 0. Next, when matching the top 1 candidate category (i.e., category 5) of sub-region 2, the number of target objects of category 5 in the statistical table is zero, and thus the matching is unsuccessful. Next, when matching the top 1 candidate category (i.e., category 20) of sub-region 3, the statistical table does not include category 20 and thus the matching is unsuccessful.

Then the top 2 candidate category for sub-region 2 is matched. For sub-region 2, the top 2 candidate category is category 10; and category 10 exists in the statistical table and thus the category of the target objects in sub-region 2 is marked as category 10. According to the image recognition result, the number of the target objects in sub-region 2 is 11. The number of target objects of the category 10 in the statistical table subtracts 11 to be −1 but is set to be 0. Next, when matching the top 2 candidate category (i.e., category 5) of sub-region 3, the number of target objects of category 5 in the statistical table is zero, and thus the matching is unsuccessful.

The top 3 candidate categories of sub-region 3 are finally matched. The top 3 candidate category (i.e., category 10) of sub-region 3 is not in the statistical table. At this time, the number of the target objects of category 50 in the statistical table is 4 and greater than 0, and thus the category of sub-region 3 is marked as category 50. According to the image recognition result, the number of the target objects in sub-region 3 is 4. The number of target objects of category 50 in the statistical table subtracts 4, to be 0.

Finally, the output result includes the category and number of the target objects in each sub-region in the target region, and is applied to restore scene. If multiple target regions exist, for each target region, the target objects in the target region are recognized according to the aforementioned method.

The embodiments of the present disclosure have the following advantages:

(1) the embodiments of the present disclosure combine characteristics of the high accuracy for recognizing position information and quantity information of articles in an image recognition mode and the high accuracy for recognizing article category in a radio frequency recognition mode; by fusing the two recognition results, as compared with a single sensor solution, more information may be obtained, more accurate the result would be, and the distribution condition of the target objects in the target region can be truly restored;

(2) processing logic is simple, stability is high, and it is adaptive for a real-time processing system; and (3) the embodiments of the present disclosure are adaptive for recognition solutions for various sheet-shaped articles, and the applicability is wide.

The embodiments of the present disclosure may be used in a smart casino application scene; in the application scene, the target objects are chips (counters); chips with each denomination correspond to a category; the target region is a gambling table region, including a betting region (generally being used for placing chips stacked in the first stacking mode) and a region for storing chips stacked in the second stacking mode (referred to as a floating chip region). In the floating chip region, a sub-region may be a region in the middle of two white separation sheets. In the betting region, a sub-region may be a region corresponding to a bounding box for a chip. According to the embodiments of the present disclosure, the category and number of chips in each sub-region can be recognized.

A person skilled in the art can understanding that, in the foregoing methods of the specific implementations, the order in which the steps are written does not imply a strict execution order which constitutes any limitation to the implementation process, and the specific order of executing the steps should be determined by functions and possible internal logics thereof.

Figure 5:
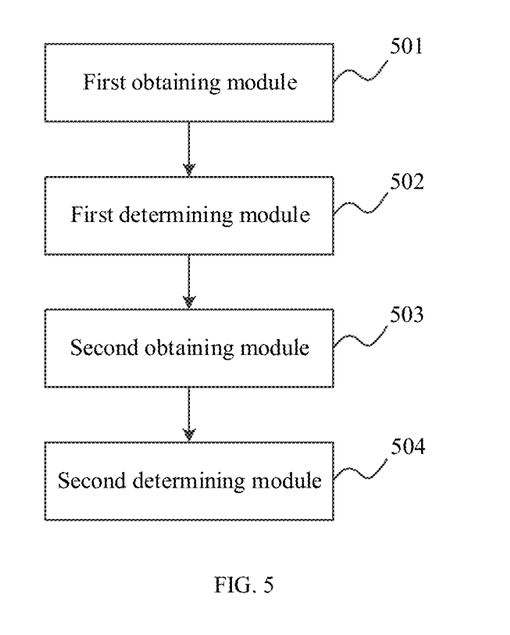
FIG. 5 is a block diagram of an apparatus for recognizing target object according to embodiments of the present disclosure.

As shown in FIG. 5, the present disclosure further provides an apparatus for recognizing target object, including:

a first obtaining module 501, configured to obtain an image of a target region;

a first determining module 502, configured to determine an image recognition result of target objects in the target region according to the image;

a second obtaining module 503, configured to obtain a radio frequency recognition result of the target objects in the target region; and a second determining module 504, configured to determine the distribution of the target objects in the target region according to the radio frequency recognition result and the image recognition result.

In some embodiments, the first determining module is configured to: process the image via a neural network to output the image recognition result of the target objects in the target region.

In some embodiments, the second obtaining module is configured to: obtain the radio frequency recognition result of the target objects in the target region via a radio frequency detection antenna arranged in the target region.

In some embodiments, the radio frequency recognition result is obtained by reading a radio frequency recognition tag disposed on each target object via the radio frequency detection antenna.

In some embodiments, the target region includes at least one sub-region; the image recognition result includes N candidate categories having the maximum confidence of target object in each of the at least one sub-region and the number of the target objects in each of the at least one sub-region;

the second determining module is configured to:

match the number of the target objects and the N candidate categories in each of the at least one sub-region in the image recognition result with categories and the number of the target objects of each category in the radio frequency recognition result according to a descending order of confidence in the image recognition result and a descending order of the number of the target objects in each of the at least one sub-region in the image recognition result; and obtain a category and the number of the target objects in each of the at least one sub-region.

In some embodiments, the second determining module includes:

a matching unit, configured to match a k-th candidate category of the target objects in an m-th sub-region and the number of the target objects in the m-th sub-region with the categories and the number of the target objects of each category in the radio frequency recognition result; wherein the k-th candidate category is one of the N candidate category corresponding to a confidence number k; confidence numbers are obtained by ranking the N candidate categories having the maximum confidence of target object in the m-th sub-region in the image recognition result according to the descending order of confidence; the m-th sub-region is a sub-region corresponding to a sub-region number m in the at least one sub-region; sub-region numbers are obtained by ranking the number of the target objects in each of the at least one sub-region in the image recognition result in a descending order;

a determining unit, configured to, n response to that the categories in the radio frequency recognition result include the k-th candidate category, and the number of the target objects of the k-th candidate category in the radio frequency recognition result is greater than zero, determine that a category of the target objects in the m-th sub-region is the k-th candidate category of the target objects in the m-th sub-region in the image recognition result and the number of the target objects in the m-th sub-region is the number of the target objects in the m-th sub-region in the image recognition result; and an adjusting unit, configured to deduct the number of the target objects in the m-th sub-region from the number of the target objects of the k-th candidate category in the radio frequency recognition result to obtain an adjusted radio frequency recognition result.

In some embodiments, the apparatus further includes:

a third determining module, configured to, in response to that the categories in the radio frequency recognition result do not include the k-th candidate category or in response to that the categories in the radio frequency recognition result include the k-th candidate category but the number of the target objects of the k-th candidate category in the radio frequency recognition result is not greater than zero, determine that matching is unsuccessful; and a fourth determining module, configured to take the m-th sub-region as a sub-region to be matched.

In some embodiments, under the condition that a sub-region to be matched exists, the apparatus further includes:

a fifth determining module, configured to, in response to that the number of the target objects of each category in the radio frequency recognition result is not greater than zero, determine that one or more candidate categories, in the N candidate categories having the maximum confidence in the sub-region to be matched, appear in the categories of the radio frequency recognition result, take the candidate category having the maximum confidence in the one or more appeared candidate categories as the category of the target objects in the sub-region to be matched, and take the number of the target objects in the sub-region to be matched in the image recognition result as the number of the target objects in the sub-region to be matched.

In some embodiments, under the condition that a sub-region to be matched exists, the apparatus further includes:

a sixth determining module, configured to, in response to that the number of the target objects of each category in the radio frequency recognition result is not greater than zero, determine that none of the N candidate categories having the maximum confidence in the sub-region to be matched, appears in the categories of the radio frequency recognition result, take the candidate category having the maximum confidence as the category of the target objects in the sub-region to be matched, and take the number of the target objects in the sub-region to be matched in the image recognition result as the number of the target objects in the sub-region to be matched.

In some embodiments, under the condition that a sub-region to be matched exists, the apparatus further includes:

a seventh determining module, configured to, in response to that the number of the target objects of at least one category in the radio frequency recognition result is greater than zero, take the category with the maximum number of the target objects in the radio frequency recognition result as the category of the target objects in the sub-region to be matched with the maximum number of the target objects in the image recognition result, and take the number of the target objects in the sub-region to be matched with the maximum number of the target objects in the image recognition result as the number of the target objects in the sub-region to be matched with the maximum number of the target objects in the image recognition result; and an adjusting module, configured to, deduct the number of the target objects in the sub-region to be matched with the maximum number of the target objects in the image recognition result from the number of the target objects in the category with the maximum number of the target objects in the radio frequency recognition result to obtain an adjusted radio frequency recognition result.

In some embodiments, the image is a top view or a side view of the target object.

In some embodiments, the top view is collected by an image collection device above the target region, and the side view is collected by an image collection device at the side of the target region.

In some embodiments, functions or modules included in the apparatus provided in the embodiments of the present disclosure may be configured to perform the method described in the foregoing method embodiments. For specific implementation of the apparatus, reference may be made to descriptions of the foregoing method embodiments. For brevity, details are not described here again.

The apparatus embodiments described above are merely exemplified, wherein the modules explained as separation parts may or may not be physically separated; the parts displayed as the modules may or may not be physical modules, i.e., they may be located at a place, and may also be distributed on multiple network modules. A part of or all of the modules may be selected according to actual needs to achieve the objectives of the solutions of the present specification. A person having ordinary skill in the art can understand and implement without involving an inventive effort.

Figure 6:
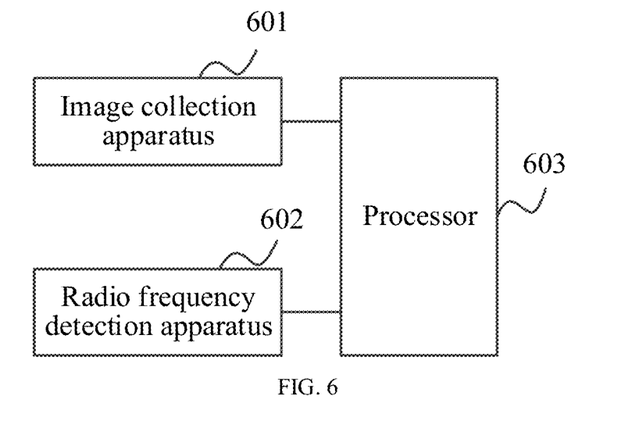
FIG. 6 is a schematic diagram of a system for recognizing target object according to embodiments of the present disclosure.

As shown in FIG. 6, the embodiments of the present disclosure further provide a system for recognizing target object, including:

an image collection apparatus 601, configured to obtain an image of a target region;

a radio frequency detection apparatus 602, configured to obtain a radio frequency recognition result of target objects in the target region; and a processor 603, configured to determine an image recognition result of the target objects in the target region according to the image; and determine the distribution of the target objects in the target region according to the radio frequency recognition result and the image recognition result.

In some embodiments, the radio frequency detection apparatus includes:

a radio frequency detection antenna and radio frequency recognition tags;

the radio frequency recognition tags are separately disposed on each target object, and the radio frequency detection antenna is disposed in the target region.

In some embodiments, a radio frequency recognition tag is embedded in the target object or is attached to a surface of a target object.

In some embodiments, there are multiple target regions; the system further includes:

an isolation apparatus, configured to isolate each target region, and to prevent a radio frequency detection apparatus in a target region from obtaining a radio frequency signal of target objects in other target regions.

In some embodiments, the isolation apparatus is made of a metal material.

In some embodiments, the image collection apparatus includes a first image collection apparatus disposed above the target region and/or a second image collection apparatus disposed at the side of the target region.

In some embodiments, determining, by the processor, the image recognition result of the target objects in the target region according to the image includes:

processing the image via a neural network to output the image recognition result of the target objects in the target region.

In some embodiments, the target region includes at least one sub-region; the image recognition result includes N candidate categories having the maximum confidence of target object in each of the at least one sub-region and the number of the target objects in each of the at least one sub-region;

determining, by the processor, the distribution of the target objects in the target region according to the radio frequency recognition result and the image recognition result includes:

matching the number of the target objects and the N candidate categories in each of the at least one sub-region in the image recognition result with categories and the number of the target objects of each category in the radio frequency recognition result according to a descending order of confidence in the image recognition result and a descending order of the number of the target objects in each of the at least one sub-region in the image recognition result; and obtaining a category and the number of the target objects in each of the at least one sub-region.

In some embodiments, matching, by the processor, the number of the target objects and the N candidate categories in each of the at least one sub-region in the image recognition result with the categories and the number of the target objects of each category in the radio frequency recognition result according to the descending order of confidence in the image recognition result and the descending order of the number of the target objects in each of the at least one sub-region in the image recognition result includes:

matching a k-th candidate category of the target objects in an m-th sub-region and the number of the target objects in the m-th sub-region with the categories and the number of the target objects of each category in the radio frequency recognition result; wherein the k-th candidate category is one of the N candidate category corresponding to a confidence number k; confidence numbers are obtained by ranking the N candidate categories having the maximum confidence of target object in the m-th sub-region in the image recognition result according to the descending order of confidence; the m-th sub-region is a sub-region corresponding to a sub-region number m in the at least one sub-region; sub-region numbers are obtained by ranking the number of the target objects in each of the at least one sub-region in the image recognition result in a descending order;

in response to that the categories in the radio frequency recognition result include the k-th candidate category, and the number of the target objects of the k-th candidate category in the radio frequency recognition result is greater than zero, determining that a category of the target objects in the m-th sub-region is the k-th candidate category of the target objects in the m-th sub-region in the image recognition result and the number of the target objects in the m-th sub-region is the number of the target objects in the m-th sub-region in the image recognition result;

deducting the number of the target objects in the m-th sub-region from the number of the target objects of the k-th candidate category in the radio frequency recognition result to obtain an adjusted radio frequency recognition result.

In some embodiments, the processor is further configured to:

in response to that the categories in the radio frequency recognition result do not include the k-th candidate category or in response to that the categories in the radio frequency recognition result include the k-th candidate category but the number of the target objects of the k-th candidate category in the radio frequency recognition result is not greater than zero, determine that matching is unsuccessful; and take the m-th sub-region as a sub-region to be matched.

In some embodiments, under the condition that a sub-region to be matched exists, the processor is further configured to:

in response to that the number of the target objects of each category in the radio frequency recognition result is not greater than zero, determine that one or more candidate categories, in the N candidate categories having the maximum confidence in the sub-region to be matched, appear in the categories of the radio frequency recognition result, take the candidate category having the maximum confidence in the one or more appeared candidate categories as the category of the target objects in the sub-region to be matched, and take the number of the target objects in the sub-region to be matched in the image recognition result as the number of the target objects in the sub-region to be matched.

In some embodiments, under the condition that a sub-region to be matched exists, the processor is further configured to:

in response to that the number of the target objects of each category in the radio frequency recognition result is not greater than zero, determine that none of the N candidate categories having the maximum confidence in the sub-region to be matched, appears in the categories of the radio frequency recognition result, take the candidate category having the maximum confidence as the category of the target objects in the sub-region to be matched, and take the number of the target objects in the sub-region to be matched in the image recognition result as the number of the target objects in the sub-region to be matched.

In some embodiments, under the condition that a sub-region to be matched exists, the processor is further configured to:

in response to that the number of the target objects of at least one category in the radio frequency recognition result is greater than zero, take the category with the maximum number of the target objects in the radio frequency recognition result as the category of the target objects in the sub-region to be matched with the maximum number of the target objects in the image recognition result, and take the number of the target objects in the sub-region to be matched with the maximum number of the target objects in the image recognition result as the number of the target objects in the sub-region to be matched with the maximum number of the target objects in the image recognition result; and deduct the number of the target objects in the sub-region to be matched with the maximum number of the target objects in the image recognition result from the number of the target objects in the category with the maximum number of the target objects in the radio frequency recognition result to obtain an adjusted radio frequency recognition result.

Embodiments of other methods implemented by the processor are the same as the method embodiments in the specification of the present disclosure, and therefore, are omitted herein for simplification.

Figure 7:
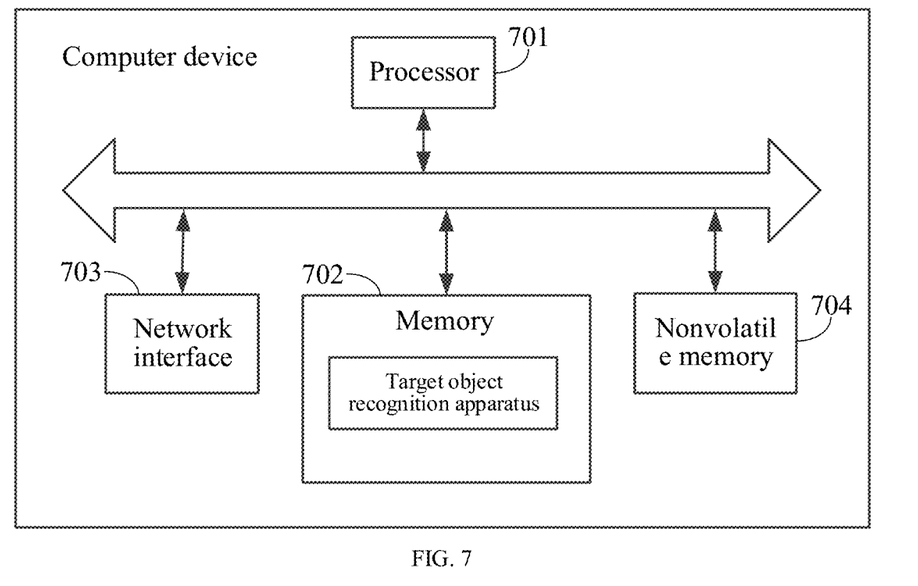
FIG. 7 is a structural schematic diagram of a computer device for implementing the method of the present disclosure according to embodiments of the present disclosure.

The embodiments of the apparatus of the present disclosure can be applied to a computer device, for example, a server or a terminal device. The apparatus embodiments may be implemented via software, and may also be implemented via hardware or a combination of the software and hardware. Taking implementation via the software as an example, as an apparatus in a logic meaning, it is formed by reading a computer program instruction corresponding to a non-volatile memory into an internal memory via a processor. On the level of hardware, as shown in FIG. 7, it is a hardware structural diagram of a computer device in which the apparatus is located in the present specification. In addition to a processor 701, an internal memory 702, a network interface 703, and a non-volatile memory 704 shown in FIG. 7, a server or electronic device in which the apparatus is located in the embodiments may further include other hardware according to actual functions of the computer device, which is omitted herein for conciseness.

Accordingly, the embodiments of the present disclosure further provide a computer-readable storage medium. A computer program is stored thereon, and when the computer program is executed by a processor, the method according to any one of the embodiments is implemented.

Accordingly, the embodiments of the present disclosure further provide a computer device, including a memory, a processor, and a computer program stored on the memory and running on the processor, where when the computer program is executed by the processor, the method according to any one of the embodiments is implemented.

The present disclosure may use the form of the computer program product implemented in one or more storage media (including but not limited to a disk memory, CD-ROM, an optical memory, etc.) that include a program code. A computer usable storage medium includes permanent and non-permanent, movable and non-movable media, and information storage can be implemented via any method or technique. Information may be computer readable commands, data structures, program modules, or other data. Examples of the storage medium of the computer include, but not limited to: a Phase Change Access Memory (PRAM), a Static Random Access Memory (SRAM), a Dynamic Random Access Memory (DRAM), other types of Random Access Memories (RAM), a Read-Only Memory (ROM), an Electrically Erasable Programmable Read-Only Memory (EEPROM), a flash memory, or other memory techniques, a CD-ROM, a Digital Versatile Disc (DVD), or other optical storages, a magnetic box typed cassette, a magnetic cassette magnetic disk, or other magnetic storage devices, or any other non-transmission media, which can be used for storing information accessible by the computer device.

After considering the specification and practicing the specification disclosed herein, a person skilled in the art would easily conceive of other implementations of the present disclosure. The present disclosure aims at covering any variation, usage or adaptive change of the present disclosure; these variations, usages or adaptive changes follow a general principle of the present disclosure and include the common general knowledge and common technical means in the present technical field that are not disclosed by the present disclosure. The specification and embodiments are only regarded as exemplified, and the true range and spirits of the present disclosure are indicated in the following claims.

It should be understood that the present disclosure does not limit at an accurate structure that is described above and shown in the drawings, and can be modified and changed in every way without departing from the scope thereof. The scope of the present disclosure is limited only by the attached claims.

The above descriptions are merely preferred embodiments of the present disclosure and are not intended to limit the present disclosure. Any modification, equivalent replacement, or improvement made within the spirit and principle of the present disclosure shall fall within the scope of protection of the present disclosure. The descriptions of the embodiments in the present application trend on differences between the embodiments, and for same or similar parts in the embodiments, refer to these embodiments. For the purpose of brevity, details are not described again.

The invention claimed is:

1. A method for recognizing a target object, comprising:
   obtaining an image of a target region;
   determining an image recognition result of target objects in the target region according to the image;
   obtaining a radio frequency recognition result of the target objects in the target region; and
   determining a distribution of the target objects in the target region according to the radio frequency recognition result and the image recognition result;
   wherein
   the target region comprises at least one sub-region, and the image recognition result comprises N candidate categories having top-N confidence values of the target objects in each of the at least one sub-region and a number of the target objects in each of the at least one sub-region, and
   determining the distribution of the target objects in the target region according to the radio frequency recognition result and the image recognition result comprises:
      respectively matching the N candidate categories and the number of the target objects in each of the at least one sub-region in the image recognition result with categories and a number of the target objects of each category in the radio frequency recognition result, according to a descending order of the top-N confidence values and a descending order of the number of the target objects in each of the at least one sub-region in the image recognition result; and
      obtaining a category and the number of the target objects in each of the at least one sub-region.

2. The method according to claim 1, wherein determining the image recognition result of the target objects in the target region according to the image comprises:
   processing the image via a neural network to output the image recognition result of the target objects in the target region.

3. The method according to claim 1, wherein obtaining the radio frequency recognition result of the target objects in the target region comprises:
   obtaining the radio frequency recognition result of the target objects in the target region via a radio frequency detection antenna arranged in the target region.

4. The method according to claim 3, wherein the radio frequency recognition result is obtained by reading a radio frequency recognition tag disposed on each of the target objects via the radio frequency detection antenna.

5. The method according to claim 1, wherein respectively matching the N candidate categories and the number of the target objects in each of the at least one sub-region in the image recognition result with the categories and the number of the target objects of each category in the radio frequency recognition result according to the descending order of the top-N confidence values and the descending order of the number of the target objects in each of the at least one sub-region in the image recognition result comprises:
   matching a k-th candidate category of the target objects in an m-th sub-region and a number of the target objects in the m-th sub-region with the categories and the number of the target objects of each category in the radio frequency recognition result; wherein the k-th candidate category is one of the N candidate categories corresponding to a confidence number k; wherein confidence numbers are obtained by ranking the N candidate categories in the m-th sub-region in the image recognition result according to the descending order of the top-N confidence values; wherein the m-th sub-region is a sub-region corresponding to a sub-region number m in the at least one sub-region; and wherein sub-region numbers are obtained by ranking the number of the target objects in each of the at least one sub-region in the image recognition result in a descending order;
   in response to that the categories in the radio frequency recognition result comprise the k-th candidate category, and the number of the target objects of the k-th candidate category in the radio frequency recognition result is greater than zero,
      determining that a category of the target objects in the m-th sub-region is the k-th candidate category of the target objects in the m-th sub-region in the image recognition result and the number of the target objects in the m-th sub-region is the number of the target objects in the m-th sub-region in the image recognition result; and
      deducting the number of the target objects in the m-th sub-region from the number of the target objects of the k-th candidate category in the radio frequency recognition result to obtain an adjusted radio frequency recognition result.

6. The method according to claim 5, further comprising:
   in response to that the categories in the radio frequency recognition result do not comprise the k-th candidate category or in response to that the categories in the radio frequency recognition result comprise the k-th candidate category but the number of the target objects of the k-th candidate category in the radio frequency recognition result is not greater than zero, determining that matching is unsuccessful; and
   determining the m-th sub-region as a sub-region to be matched.

7. The method according to claim 6, wherein when determining the m-th sub-region as the sub-region to be matched, the method further comprises:
   in response to that the number of the target objects of each category in the radio frequency recognition result is not greater than zero, determining that one or more candidate categories, in the N candidate categories in the sub-region to be matched, appear in the categories of the radio frequency recognition result,
   taking the candidate category having a maximum confidence value in one or more appeared candidate categories as the category of the target objects in the sub-region to be matched, and taking the number of the target objects in the sub-region to be matched in the image recognition result as the number of the target objects in the sub-region to be matched.

8. The method according to claim 6, wherein when determining the m-th sub-region as the sub-region to be matched, the method further comprises:
in response to that the number of the target objects of each category in the radio frequency recognition result is not greater than zero, determining that none of the N candidate categories in the sub-region to be matched appears in the categories of the radio frequency recognition result,
taking the candidate category having a maximum confidence value as the category of the target objects in the sub-region to be matched, and
taking the number of the target objects in the sub-region to be matched in the image recognition result as the number of the target objects in the sub-region to be matched.

9. The method according to claim 6, wherein when determining the m-th sub-region as the sub-region to be matched, the method further comprises:
in response to that the number of the target objects of at least one category in the radio frequency recognition result is greater than zero,
taking the category with a first maximum number of the target objects in the radio frequency recognition result as the category of the target objects in the sub-region to be matched with a second maximum number of the target objects in the image recognition result, and
taking the number of the target objects in the sub-region to be matched with the second maximum number of the target objects in the image recognition result as the number of the target objects in the sub-region to be matched with the second maximum number of the target objects in the image recognition result; and
deducting the number of the target objects in the sub-region to be matched with the second maximum number of the target objects in the image recognition result from the number of the target objects in the category with the first maximum number of the target objects in the radio frequency recognition result to obtain an adjusted radio frequency recognition result.

10. A system for recognizing a target object, comprising:
an image collection apparatus, configured to obtain an image of a target region;
a radio frequency detection apparatus, configured to obtain a radio frequency recognition result of target objects in the target region; and
a processor, configured to determine an image recognition result of the target objects in the target region according to the image, and determine a distribution of the target objects in the target region according to the radio frequency recognition result and the image recognition result;
wherein the target region comprises at least one sub-region, and the image recognition result comprises N candidate categories having top-N confidence values of the target objects in each of the at least one sub-region and a number of the target objects in each of the at least one sub-region; and
determining the distribution of the target objects in the target region according to the radio frequency recognition result and the image recognition result comprises:
respectively matching the N candidate categories and the number of the target objects in each of the at least one sub-region in the image recognition result with categories and a number of the target objects of each category in the radio frequency recognition result according to a descending order of the top-N confidence values and a descending order of the number of the target objects in each of the at least one sub-region in the image recognition result; and
obtaining a category and the number of the target objects in each of the at least one sub-region.

11. The system according to claim 10, wherein respectively matching, by the processor, the N candidate categories and the number of the target objects in each of the at least one sub-region in the image recognition result with the categories and the number of the target objects of each category in the radio frequency recognition result according to the descending order of the top-N confidence values and the descending order of the number of the target objects in each of the at least one sub-region in the image recognition result comprises:
matching a k-th candidate category of the target objects in an m-th sub-region and a number of the target objects in the m-th sub-region with the categories and the number of the target objects of each category in the radio frequency recognition result; wherein the k-th candidate category is one of the N candidate categories corresponding to a confidence number k; wherein confidence numbers are obtained by ranking the N candidate categories in the m-th sub-region in the image recognition result according to the descending order of the top-N confidence values; wherein the m-th sub-region is a sub-region corresponding to a sub-region number m in the at least one sub-region; and wherein sub-region numbers are obtained by ranking the number of the target objects in each of the at least one sub-region in the image recognition result in a descending order;
in response to that the categories in the radio frequency recognition result comprise the k-th candidate category, and the number of the target objects of the k-th candidate category in the radio frequency recognition result is greater than zero,
determining that a category of the target objects in the m-th sub-region is the k-th candidate category of the target objects in the m-th sub-region in the image recognition result and the number of the target objects in the m-th sub-region is the number of the target objects in the m-th sub-region in the image recognition result; and
deducting the number of the target objects in the m-th sub-region from the number of the target objects of the k-th candidate category in the radio frequency recognition result to obtain an adjusted radio frequency recognition result.

12. The system according to claim 11, wherein the processor is further configured to:
in response to that the categories in the radio frequency recognition result do not comprise the k-th candidate category or in response to that the categories in the radio frequency recognition result comprise the k-th candidate category but the number of the target objects of the k-th candidate category in the radio frequency recognition result is not greater than zero, determine that matching is unsuccessful; and
determine the m-th sub-region as a sub-region to be matched.

13. The system according to claim 12, wherein when determining the m-th sub-region as the sub-region to be matched, the processor is further configured to:
   in response to that the number of the target objects of each category in the radio frequency recognition result is not greater than zero, determine that one or more candidate categories, in the N candidate categories in the sub-region to be matched, appear in the categories of the radio frequency recognition result,
      take the candidate category having a maximum confidence value in one or more appeared candidate categories as the category of the target objects in the sub-region to be matched, and
      take the number of the target objects in the sub-region to be matched in the image recognition result as the number of the target objects in the sub-region to be matched.

14. The system according to claim 12, wherein when determining the m-th sub-region as the sub-region to be matched, the processor is further configured to:
   in response to that the number of the target objects of each category in the radio frequency recognition result is not greater than zero, determine that none of the N candidate categories in the sub-region to be matched appears in the categories of the radio frequency recognition result,
      take the candidate category a maximum confidence value as the category of the target objects in the sub-region to be matched, and
      take the number of the target objects in the sub-region to be matched in the image recognition result as the number of the target objects in the sub-region to be matched.

15. The system according to claim 12, wherein when determining the m-th sub-region as the sub-region to be matched exists, the processor is further configured to:
   in response to that the number of the target objects of at least one category in the radio frequency recognition result is greater than zero,
      take the category with a first maximum number of the target objects in the radio frequency recognition result as the category of the target objects in the sub-region to be matched with a second maximum number of the target objects in the image recognition result, and
      take the number of the target objects in the sub-region to be matched with the second maximum number of the target objects in the image recognition result as the number of the target objects in the sub-region to be matched with the second maximum number of the target objects in the image recognition result; and
   deduct the number of the target objects in the sub-region to be matched with the second maximum number of the target objects in the image recognition result from the number of the target objects in the category with the first maximum number of the target objects in the radio frequency recognition result to obtain an adjusted radio frequency recognition result.

16. A non-transitory computer-readable storage medium having a computer program stored thereon, wherein when the computer program is executed by a processor, the processor is caused to perform operations comprising:
   obtaining an image of a target region;
   determining an image recognition result of target objects in the target region according to the image;
   obtaining a radio frequency recognition result of the target objects in the target region; and
   determining a distribution of the target objects in the target region according to the radio frequency recognition result and the image recognition result;
   wherein the target region comprises at least one sub-region, and the image recognition result comprises N candidate categories having top-N confidence values of the target objects in each of the at least one sub-region and a number of the target objects in each of the at least one sub-region; and
   determining the distribution of the target objects in the target region according to the radio frequency recognition result and the image recognition result comprises:
      respectively matching the N candidate categories and the number of the target objects in each of the at least one sub-region in the image recognition result with categories and a number of the target objects of each category in the radio frequency recognition result according to a descending order of the top-N confidence values and a descending order of the number of the target objects in each of the at least one sub-region in the image recognition result; and
      obtaining a category and the number of the target objects in each of the at least one sub-region.

* * * * *